United States Patent
Dorenbosch et al.

(10) Patent No.: US 7,185,091 B2
(45) Date of Patent: Feb. 27, 2007

(54) METHOD AND SYSTEM FOR TRANSMITTING COMPRESSED MESSAGES AT A PROXY TO A MOBILE DEVICE IN A NETWORK

(75) Inventors: Jheroen P. Dorenbosch, Paradise, TX (US); James E. Womack, Bedford, TX (US)

(73) Assignee: Motorola, Inc., Schaumburg, IL (US)

( * ) Notice: Subject to any disclaimer, the term of this patent is extended or adjusted under 35 U.S.C. 154(b) by 341 days.

(21) Appl. No.: 10/717,769

(22) Filed: Nov. 20, 2003

(65) Prior Publication Data

US 2005/0114513 A1    May 26, 2005

(51) Int. Cl.
    G06F 15/16    (2006.01)
    G06F 15/173   (2006.01)

(52) U.S. Cl. .............. 709/224; 709/232; 709/235; 709/239; 709/247

(58) Field of Classification Search .............. 709/206, 709/224, 227, 237, 244, 246, 247, 232, 235, 709/239; 455/411
See application file for complete search history.

(56) References Cited

U.S. PATENT DOCUMENTS

| | | | |
|---|---|---|---|
| 6,857,072 B1 | 2/2005 | Schuster et al. | |
| 7,003,282 B1 * | 2/2006 | Ekberg | 455/411 |
| 2003/0097584 A1 * | 5/2003 | Haukka et al. | 713/200 |
| 2003/0120813 A1 * | 6/2003 | Majumdar et al. | 709/247 |
| 2003/0217165 A1 * | 11/2003 | Buch et al. | 709/229 |
| 2004/0143671 A1 | 7/2004 | Idnani | |
| 2004/0162032 A1 * | 8/2004 | Li et al. | 455/72 |
| 2004/0203942 A1 * | 10/2004 | Dehlin | 455/466 |
| 2004/0215766 A1 * | 10/2004 | Haddad | 709/224 |
| 2005/0044127 A1 | 2/2005 | Jaiswal et al. | |
| 2005/0097200 A1 * | 5/2005 | Denning et al. | 709/223 |
| 2005/0131989 A1 | 6/2005 | Beckmann et al. | |

* cited by examiner

Primary Examiner—Rupal Dharia
Assistant Examiner—Quang N. Nguyen

(57) ABSTRACT

A system and method for facilitating communications in a network includes receiving a message from a mobile unit having a contact address. A proxy establishes a contact alias associated with the mobile unit and the contact address. The proxy intercepts and identifies at least one signaling message that includes the contact alias. The proxy compresses the at least one signaling message that includes the contact alias. The compressed at least one signaling message is routed to the mobile unit with the contact address.

20 Claims, 4 Drawing Sheets

METHOD AND SYSTEM FOR TRANSMITTING COMPRESSED MESSAGES AT A PROXY TO A MOBILE DEVICE IN A NETWORK

FIELD OF THE INVENTION

The invention relates generally to communication systems and more particularly to transmitting messages in communication networks.

BACKGROUND OF THE INVENTION

Systems and methods for transmitting communications in networks and between networks are well known. For example, cellular messages may be received via a cellular network, converted into packets of information, and transmitted over a packet data network (PDN) to various destinations.

Various types of protocols are used to enable the transmission of messages across these networks. The protocols may be for signaling or actually sending the desired information. One example of a signaling protocol is the Session Initiation Protocol (SIP) described in IETF RFC 3261, which may be used to transmit and receive messages across PDN networks. SIP is often used in Internet conference, telephony, and instant messaging applications. In one example of a SIP message, an INVITE message is used to invite a user or a unit to participate in a call while other SIP messages (such as RINGING, OK, ACK and BYE) are required to control the call. In another example, a REGISTER message is used to register a mobile unit at a particular IP address in the network.

A system conforming to the SIP protocol utilizes proxies or agents to handle various processing functions. For example, a proxy may create a contact alias that identifies a mobile unit. This contact alias may be created when the unit sends a REGISTER message to the proxy. After processing, all future SIP messages directed at the mobile unit, for instance all INVITE messages for the mobile unit, will be sent to the proxy.

One problem that arises in many of the above-mentioned systems is that the amount of information that is transmitted between points in the network often becomes great thereby significantly slowing the operation of the network. For example, the number of INVITE messages may multiply during the course of network operation. If the level of message loading becomes large, a significant reduction of network performance is known to occur. This problem is particularly severe in wireless networks, such as cellular telephony systems because data rates at the air interface are generally lower than the rest of the network. Certain techniques, for instance message compression, are used in computer networks to reduce message size and increase network performance. However, current systems do not combine the use of an alias together with message compression. This results in network congestion and the slowing of network operation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Pursuant to many of these embodiments, a system and method for compressing information in a communication network is provided. A proxy receives a registration message from a mobile unit having a contact address. The proxy establishes a contact alias associated with the mobile unit and the contact address. The proxy intercepts and identifies at least one signaling message that includes the contact alias and compresses the signaling message that includes the contact alias. The proxy may route the compressed signaling message to the mobile unit with the contact address. Alternatively, the proxy may route the compressed message to a mobile unit directly to a conventional cellular network, if it is determined that the call is a cellular call destined for the mobile unit.

Pursuant to another preferred approach, a proxy for facilitating communications in a network includes a signaling register, alias register, and controller. The device may receive a registration message from a mobile unit via an interface. The registration message includes a contact address. The controller may transform the contact address into a contact alias, which is stored in the alias register. The controller also replaces the contact address with the contact alias. Henceforth, signaling messages, which include the contact alias, will be routed to the proxy, rather than to the mobile unit.

The controller may monitor messages that are to be sent over the air. When the controller detects a signaling message that includes the contact alias, the message is placed in the signaling register, where the message is compressed and sent to the mobile unit associated with the contact alias. The controller may compress the entire signaling message or extract portions of the signaling message and compress the extracted portions.

Advantageously, the above embodiments allow for compressed messages to be generated from signaling messages and sent to a mobile unit. Since the number of signaling messages is often large, calls are transmitted and received more quickly by the mobile unit, with less bandwidth usage and with a minimum of delay. Congestion of the air interface is also reduced.

Figure 1:
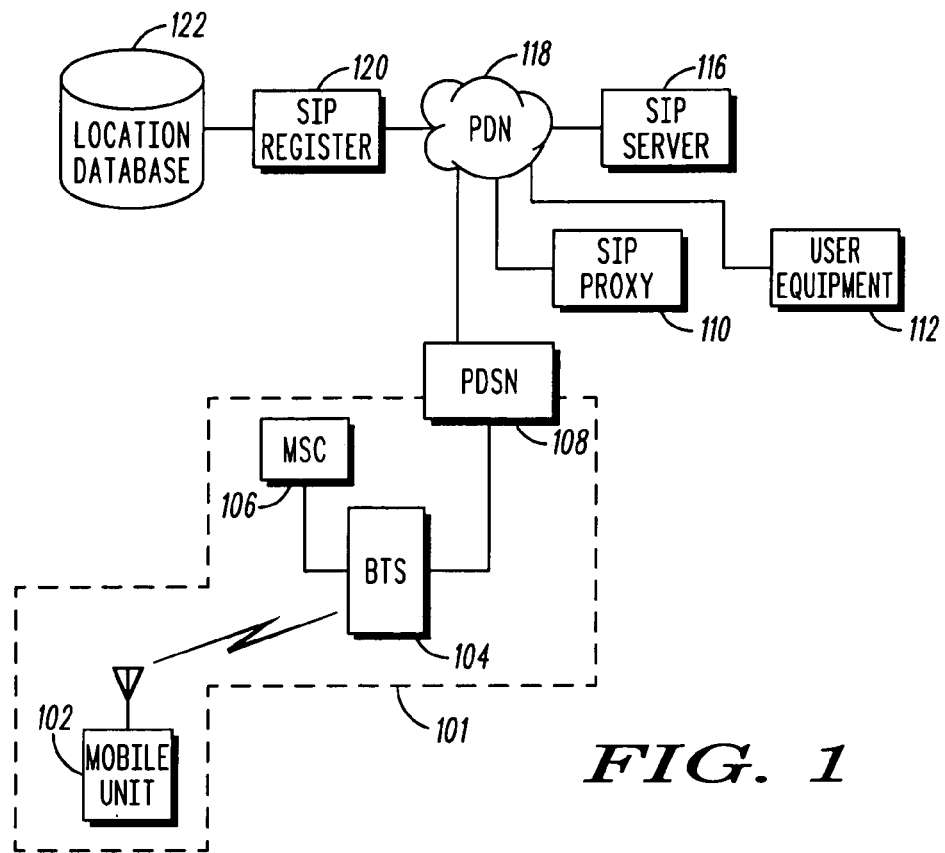
FIG. 1 is a block diagram of system for compressing messages in a network in accordance with one embodiment of the invention.

Referring initially to FIG. 1, a system for transmitting compressed information in a network includes a mobile unit 102, a base transmission station (BTS) 104, a mobile switching center (MSC) 106, a packet data serving node (PDSN) 108, a SIP proxy 110, a user equipment 112, a SIP server 116, a packet data network (PDN) 118, a SIP registrar 120, and a location database 122. A radio network 101 includes the mobile unit 102, the BTS 104, the MSC 106, and PDSN 108. The system will contain one or more other databases (not shown) such as a Home Location Register, a Visited Location Register and an Authentication, Authorization and Accounting (AAA) authentication server.

The mobile unit 102 is communicatively coupled to the BTS 104. The BTS 104 is coupled to the MSC 106 and the PDSN 108. The PDSN 108 is coupled to the PDN 118. The PDN 118 is coupled to the SIP registrar 120, the SIP proxy 110, and the SIP server 116, and the user equipment 112. The SIP registrar 120 is coupled to the location database 122. It will be understood that although the SIP proxy 110, SIP registrar 120, and SIP server 116 are configured to process SIP messages, any type of messages conforming to any signaling protocol may be used and that the embodiments described herein are not limited to messages conforming to SIP. It will also be understood that the SIP proxy 110 can be located at different locations. For example, it can be inside and part of the radio network 101. In particular, it can be collocated with the BTS 104.

The mobile unit 102 is any type of mobile communication device. In one preferred approach, the mobile unit 102 is a cellular phone. However, the mobile unit 102 may be a pager, personal digital assistant, or any other type of mobile communication device that transmits and/or receives any type of information in a wireless fashion. Preferably the mobile unit 102 supports wireless packet data.

The base transmission station (BTS) 104 transmits messages to and receives messages from the mobile unit 102. In one example, the BTS 104 includes a radio receiver and transmitter for receiving communications from and transmitting communications to the mobile unit 102. The BTS 104 may also include a base station controller, which manages resources on the radio network 101 where the mobile unit 102 resides. The base station controller may also provide other services to the mobile unit that are well known to those skilled in the art.

The mobile switching center (MSC) 106 provides call-handling functions for the radio network 101. For example, the MSC 106 may provide switching functions and manage call control in the radio network 101. The MSC 106 may also handle the establishment and maintenance of connections with the PDN 118 via the PDSN 108. The MSC functionality may also be provided by a General Packet Radio Service Serving Gateway Support Node (GPRS SGSN) or a Universal Terrestrial Radio Access Network (UTRAN) SGSN.

The packet data serving node (PDSN) 108 is an interface between the radio network 101 and the PDN 118. For example, the PDSN 108 exchanges IP packets between the radio network 101 and the PDN 108. The PDSN 108 may also provide subscriber billing and authentication functions. The PDSN functionality may also be provided by a GPRS GGSN or a UTRAN GGSN.

The SIP proxy 110 performs functions related to the generation of a contact alias. In one example, the proxy 110 receives the contact address of the mobile unit 102 in a REGISTER message from the mobile unit 102 in the standard way. The contact address describes how or where the mobile unit can be 'contacted' or reached. The contact address typically contains the current IP address of the mobile unit, but it can also contain the mobile unit's Mobile Station Integrated Services Digital Network (MSISDN) or telephone number.

In one embodiment of the invention, the proxy 110 creates a contact alias for the contact address. The proxy 110 then replaces the contact address received from the mobile unit 102 in the REGISTER message with the contact alias and forwards the thus modified REGISTER message to the registrar 120 in the standard way. The contact alias may be stored by the registrar in the database 122. Alternatively, the mobile unit 102 may generate the contact alias itself and insert it into the REGISTER message instead of the contact address and forward the modified REGISTER message to the proxy 110 and thus to the registrar 120. This assumes that the mobile unit knows the host name of the proxy 110, for example, through configuration.

The SIP proxy 110 also monitors network traffic for SIP messages which include the contact alias of the mobile unit 102. If the contact alias of the mobile unit 102 is detected in a SIP message, in one approach, the SIP proxy 110 performs compression on the SIP message and forwards the compressed SIP message to the mobile unit 102. In another approach, the message or portions of the message may be compressed into a non-SIP message. In addition, the proxy 110 may insert a SIP Record-Route header into the compressed message and into the response to the SIP INVITE message so that all messages for the remainder of the session are routed to the proxy 110 and compressed before being forwarded to the mobile unit 102.

The SIP proxy 110 may perform other functions, as well. For example, the SIP proxy 110 may decompress over-the-air request and response messages received from the mobile unit 102 to obtain a standard SIP message and forward the message to the SIP server 116. In this case, the mobile unit 102 may generate the contact alias itself and insert it into the compressed message instead of the contact address and forward it to the proxy 110. In addition, the proxy 110 may broadcast or advertise the presence and ability of the proxy 110 to perform SIP message compression. This may be in the form of using an existing broadcast message or a new broadcast message.

A wireless interface may also be provided between the proxy 110 and a mobile unit 102. The wireless interface may be used to speed up the SIP message. In this case, the proxy 110 is provided with a direct connection to the wireless system allowing the proxy 110 to transmit and receive messages to and from a mobile unit 102 without having to establish a wired traffic channel across the radio network 101. In one example, which is particularly appropriate if the proxy 101 is collocated with the BTS 104, the proxy 110 may use the legacy wireless signaling channel between the BTS 104 and the mobile unit 102 to alert the mobile unit 102 via a legacy cellular page and a legacy cellular call setup message. Such legacy cellular messages can thus be sent over a legacy cellular channel, which is not a packet data channel. Hence, in this example, a SIP server 116 can use standard SIP messages to communicate with a mobile unit 102 that does not support SIP or with a mobile unit 102 that does not have a packet data channel that supports the IP protocol.

The user equipment 112 is any type of device that allows a user to monitor conditions in a computer network. For instance, a user may wish to monitor system or network performance. In one convenient approach, the user equipment 112 may be a personal computer.

The location database 122 is any type of storage device that stores any type of information. In addition, the location database 122 may also include information that is used by the SIP server 116 to determine the location or contact address where the mobile unit 102 can currently be reached. Specifically, the location database 122 may include information that the SIP registrar uses to obtain the current contact address of the mobile unit 102, for instance, information used to translate the universal resource identifier (URI) of a message into a current contact address.

The SIP server 116 may be implemented as a processor, which executes computer instructions stored in a memory. The SIP server 116 may perform call-setup functions and locate a target device of the call. In one example, the SIP server 116 uses the URI address of the destination of a message to determine, with the help of the registrar 120, the contact address of where the destination is currently located.

The packet data network (PDN) 118 is any type of network that can transmit packets of information. For example, the network may be the Internet or any other extranet. Other types of packet data networks are possible, including, for example, local area networks. In many cases all or part of the PDN will be owned and operated by the operator of the radio network 101.

The SIP registrar 120 is any type of device that processes SIP registration requests. In one example, the SIP registrar 120 handles SIP REGISTER messages by storing and associating a contact alias with the contact information for a mobile unit. When a SIP message is intercepted having a specified URI, then the SIP registrar 120 is consulted to determine the contact information for the URI.

In one example of the operation of the system of FIG. 1, the mobile unit 102 sends a REGISTER message to the SIP proxy 110. As is known in the art, the message is received at the BTS 104 and transmitted to the SIP proxy 110 via the PDSN 108 and the PDN 118.

The REGISTER message includes a URI destination address and a contact address for the mobile unit 102. The SIP proxy 110 takes the contact address and forms a contact alias based on the contract address. For instance, if the original contact were "sip:SU@1.2.3.4", with 1.2.3.4 being the current IP address of the mobile unit 102 the contact alias created by the SIP proxy 110 may be "sip:SU %1.2.3.4@local.sprint.com" where "local.sprint.com" is the address of the SIP proxy 110. This contact alias is sent to the SIP registrar 120 via the PDN 118. Henceforth, all SIP messages, for example, SIP INVITE messages directed at the URI destination address of the mobile unit 102, will be routed to the contact alias, which points at the SIP proxy 110 instead of to the contact address of the mobile unit 102.

Preferably, the SIP proxy 110 forms the contact alias such that it contains the original contact address information provided by the mobile unit 102. When forming the contact alias, for technical reasons, the original '@' is escaped with '%' or '%40'. Hence the SIP registrar 120 will persistently store both the contact alias information associated with the mobile unit and the contact address information associated with the mobile unit. The proxy itself does not need to persistently store the contact address, but can derive it later from contact alias. Other forms of contact aliases are possible too and some of those forms may require persistent storage at the proxy 110 so it can derive the contact address from the contact alias. For example, the proxy 110 can use contact alias "MU1000@local.sprint.com" and persistently store the association between the mobile unit, the text "MU1000" and the mobile unit's contact address "sip:SU@1.2.3.4". In each case, the contact alias is constructed such that SIP INVITE messages sent to the contact alias will be directed to the proxy first. In this case, this is accomplished by the use of the host name local.sprint.com.

The mobile unit 102 may receive an INVITE message from another mobile unit. The SIP proxy 110 may intercept the INVITE message and determine that the message includes the contact alias. Then, the SIP proxy 110 converts the contact alias to the contact address and compresses the resulting INVITE message. Next, the compressed INVITE message is sent to the mobile unit 102. Alternatively, portions of the INVITE message may be compressed and these compressed portions may be sent to the mobile unit 102 in a non-SIP message, such as a legacy cellular page and a legacy cellular call setup message. Thus, compressed messages are generated from signaling messages at the proxy 110 and sent to a mobile unit 102. Since the number of signaling messages may become large, calls are transmitted and received more quickly by the mobile unit 102 and with a minimum of delay. Network congestion is also reduced on the air link between the BTS 104 and the MS 102.

Figure 2:
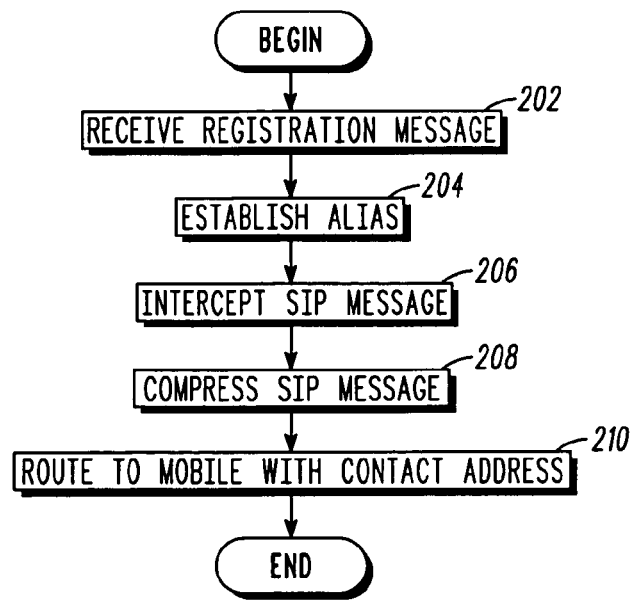
FIG. 2 is a flowchart of a method for compressing messages in a network in accordance with one embodiment of the invention.

Referring now to FIG. 2, one example of a method of transmitting compressed messages in a network is described. At step 202, a proxy receives a registration message from a mobile unit. The message includes the contact address of the originating mobile unit. The registration message can be a SIP REGISTER message or a legacy cellular registration message.

At step 204 the proxy establishes a contact alias associated with the mobile unit and the contact address. Any identifier name may be used. However, as explained elsewhere in this application, in one preferred approach, the contact alias name incorporates the contact address of the source mobile unit. For instance, if the original contact were "sip:SU@1.2.3.4" the contact alias may be "sip:SU %1.2.3.4@local.sprint.com" where "local.sprint.com" is the host name address of the proxy server.

At step 206, the proxy intercepts and identifies at least one SIP message that includes the contact alias. For instance, using the previous example, the proxy identifies the contact alias "sip:SU %1.2.3.4@local.sprint.com". The proxy may monitor and intercept SIP messages using techniques that are well known to those skilled in the art. Monitoring and interception is greatly simplified by the preceding transformation of the contact address, which causes the routing of all later INVITE messages for the mobile unit 102 to the proxy 110.

At step 208, the proxy compresses the at least one SIP message that includes the contact alias. In one example, the proxy extracts information from the SIP message, compresses the information, and transmits the information to the destination mobile unit. The compressed message that is transmitted to the mobile unit may be a SIP message or a non-SIP message.

At step 210, the proxy routes the compressed message to the mobile unit. For example, if the proxy determines that the contact alias "sip:SU %1.2.3.4@local.sprint.com" relates to contact address "sip:SU@1.2.3.4," then the proxy routes the compressed message to the mobile unit with that contact address at IP address 1.2.3.4.

Figure 3:
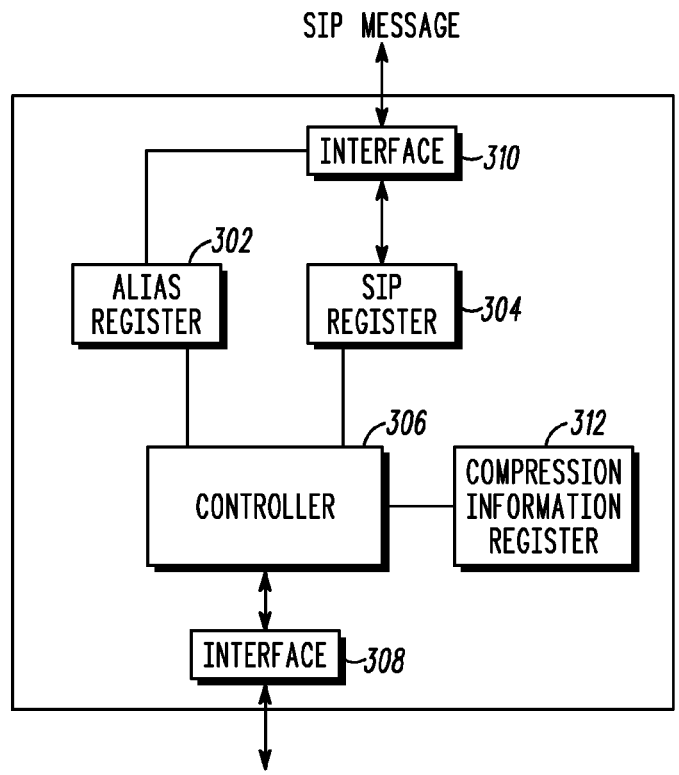
FIG. 3 is a block diagram of a proxy in accordance with one embodiment of the invention.

Referring now to FIG. 3, a system for transmitting compressed information in a network is described. The system is contained in the SIP proxy 110. The system includes a controller 306, an alias register 302, a SIP register 304, and interfaces 310 and 308. The interface 310 is coupled to the SIP register 304. The SIP register 304 is coupled to the controller 306. The controller 306 is coupled to the alias register 302 and the interface 308.

The alias register 302 is any type of memory storage device capable of storing any type of information. In one example, the alias register 302 stores a contact alias associated with a mobile unit. The contact alias may be created by the controller 306.

The SIP register 304 is any type of memory storage device capable of storing any type of information. The SIP register 304 stores a SIP message received via one of the interfaces 308, 310. The message is identifiable as being destined for the mobile unit 102, for example, by having a contact alias for the mobile unit included in the message.

The controller 306 is any type of processing device that executes computer instructions stored in a memory. The controller 306 compresses SIP messages stored in the SIP register 304 and places the compressed SIP message in the interface 308.

The interface 308 receives compressed messages from the controller 306 and transmits these messages to a destination. In one example, a compressed SIP message is placed in the interface 308 and transmitted to a destination mobile unit. The transmission may be over the air, via a computer network, or across any other type of medium.

The interface 310 receives SIP messages. For example, the interface 310 may include a receiver, which receives SIP messages as well as a processor that monitors the SIP messages for particular aliases, which are stored in the alias register 302. When the interface 310 detects a SIP message, the SIP message may be forwarded to the SIP register 304. If the SIP message is not to be compressed, it will be forwarded to the interface 108.

A SIP message, such as a SIP REGISTER message or a SIP INVITE message originated by the mobile unit 102 may be received at the interface 308 and may include a contact address. If the mobile has not already inserted a contact alias, the controller 306 may generate one corresponding to the contact address and store the contact alias in the alias register 302. The controller 306 replaces the contact address in the SIP message with the corresponding contact alias and sends the modified SIP message to the interface 310. The interface 310 forwards the modified message via the PDN 118 to a server. The server can be a SIP server 116 or a SIP registrar 122.

The interface 310 may then receive additional SIP messages and store these SIP messages in the SIP register 304. The additional messages may include SIP INVITE messages. The controller 306 determines if a contact alias is included in a message. If a contact alias is included in the message, the controller 306 replaces the contact alias with the corresponding contact address, compresses the message or portions of the message and sends the compressed message to the interface 308. The interface 308 transmits the compressed message to the mobile unit.

The interface 308 may also receive an additional SIP message that is sent by the mobile unit 102 as the result of an INVITE sent to or from the mobile unit 102. The message may be a SIP OK; a SIP OPTIONS; another SIP INVITE; or a SIP BYE, and may include a contact address. The controller 306 stores the SIP message in the SIP register 304. The controller 306 determines if a contact address is included in the SIP message. If a contact address is included in the SIP message, the controller 306 replaces the contact address with the corresponding contact alias and sends the modified SIP message to the interface 310. The interface 310 forwards the modified message via the PDN 118 to a server.

A single call may use several SIP messages for setup and control. Consecutive messages or the same call contain a lot of redundant information. For this reason the system may also include an optional compression information register 312 that is used to store compression tables, call state, or compression dictionaries related to a call for the duration of the call. Optionally, the proxy 110 may also persistently store the correspondence between contact addresses and contact aliases or the mobile units, authentication and authorization information for the mobile unit, as well as information on the compression or decompression methods that are supported by each mobile unit 102. Such information may be obtained by the proxy 110 at the time of the registration by the mobile unit.

Figure 4:
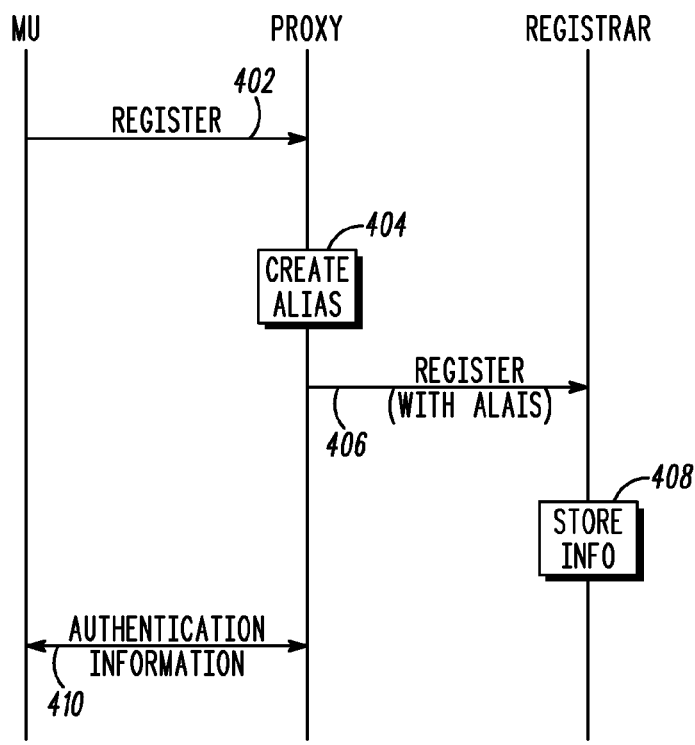
FIG. 4 is a flow diagram of a registration process in accordance with one embodiment of the invention.

Referring now to FIG. 4, a call-flow diagram of a registration process within a network is described. At step 402, a REGISTER message is sent from a mobile unit to the SIP proxy. The REGISTER message includes a destination URI address (j_dorenbosch@sprint.com) and contact information (sip:SU@1.2.3.4). The REGISTER message may be formed according to the SIP protocol. However, it will be understood that other messages from other protocols may also be used. For example, the REGISTER message can be a legacy cellular registration request or location update.

The mobile unit may use a SIP message, which includes additional information indicating that the mobile unit processes compressed messages, meaning that the mobile unit can decompress received over-the-air SIP messages and can compress SIP messages before the mobile unit transmits the messages over-the-air. For example, the new information may be in the form of a capabilities header. The SIP proxy may inspect all SIP messages. When the SIP proxy finds a message indicating that a mobile unit is capable of compressing or decompressing SIP messages, the proxy will provide compressed messages to that mobile unit and decompress messages from the mobile unit. The proxy may then receive additional information concerning the mobile unit. The capabilities information may be provided by the mobile unit 102 in SIP REGISTER messages or in a message transmitted at the start of a call, for example, when the mobile unit initiates the call. The capabilities information may also be made available by the SIP server 116 or the SIP registrar 120 in one of the SIP messages 410 that is exchanged at registration time.

At step 404, the SIP proxy creates a contact alias. In a preferred approach, the contact alias incorporates the contact address. For example, the contact alias created may be sip:SU %1.2.3.4@local.sprint.net from the contact address sip:SU@1.2.3.4. However, in other examples, the contact alias may include only some or no information related to the contact address.

At step 406, the proxy transmits the SIP REGISTER message to the SIP registrar 120. The REGISTER message includes the contact address now being the newly-created contact alias.

At step 408, the SIP registrar stores the contact information. In addition, the SIP registrar performs other tasks as known to those skilled in the art. For example, the SIP registrar may locate the contact address of a destination mobile unit, using the URI of the destination mobile unit.

At step 410, optionally, authentication information is passed between the proxy and the mobile unit. The authentication information may include password information. The authentication information is used by the proxy to verify that the mobile unit is the true destination for messages. By ensuring the identity of the end destination, sending information to unauthorized users is avoided.

Figure 5:
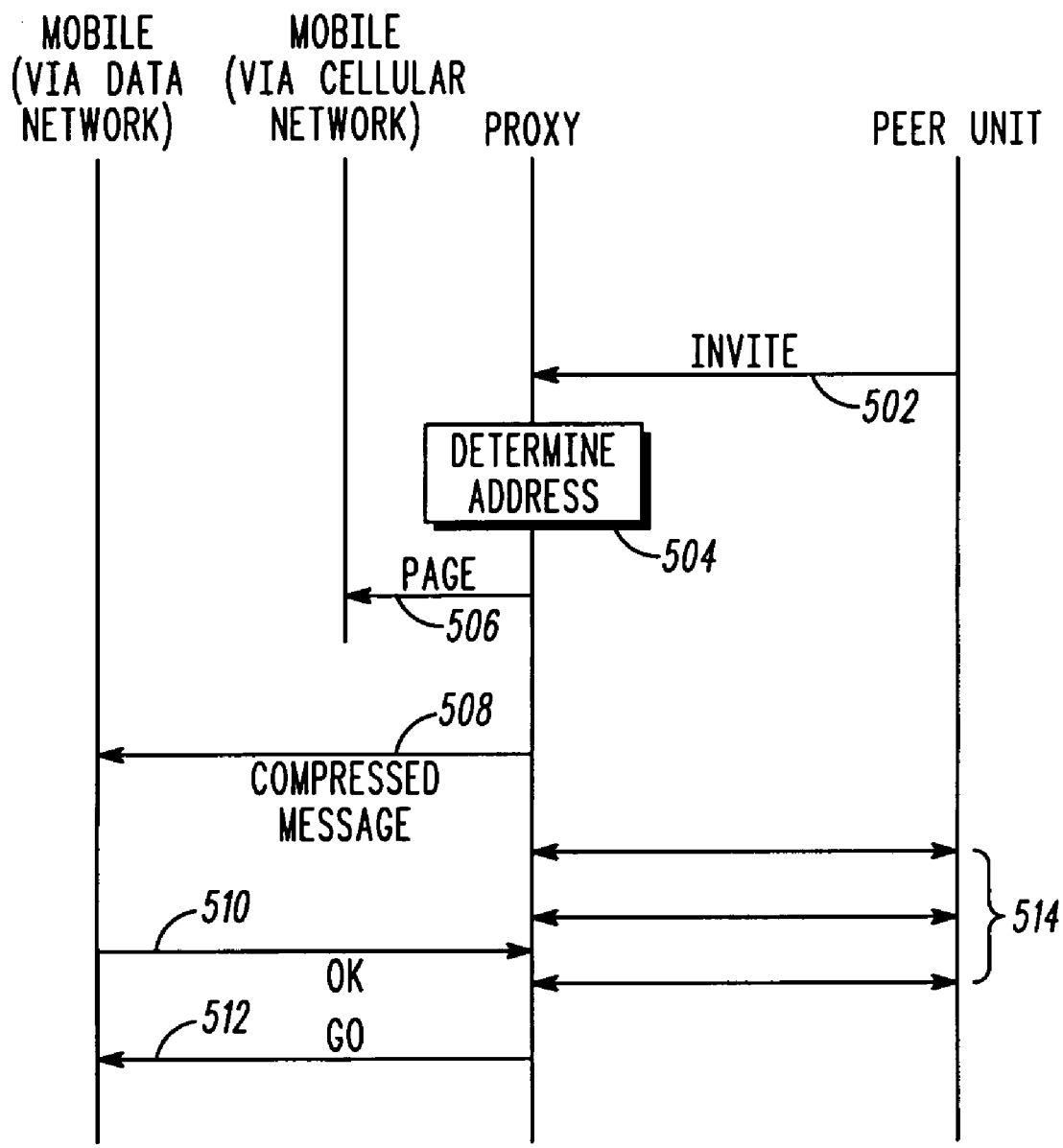
FIG. 5 is a call-flow diagram of a compression process for messages in accordance with one embodiment of the invention.

Referring now to FIG. 5, a call-flow diagram of a process for transmitting compressed messages in a network is described. At step 502, an INVITE message is received at the SIP proxy from a peer unit, for instance, from the Internet. The INVITE message has a destination address (j_dorenbosch@sprint.com) and a contact alias (sip:SU %1.2.3.4@local.sprint.net) for a mobile unit. The INVITE message may be formed according to the SIP protocol. However, it will be understood that other messages from other protocols may also be used.

At step 504, the SIP proxy determines the contact address that is related to a particular contact alias. For example, if the contact alias were sip:SU %1.2.3.4@local.sprint.net, then the contact address would be sip:SU@1.2.3.4. For this determination, the SIP proxy 110 may use the known form of the contact alias, it may use information obtained from the registrar, or it may use information persistently stored at the SIP proxy 110 itself.

At step 506, the proxy determines whether the type of message relates to a legacy cellular call, and then the proxy sends (over the air) a page and a legacy cellular call setup message, which is used to initiate a cellular call. In another example, if the message relates to setting up a standard packet data connection, then the proxy sends the message over a wireless packet data network, which routes the message to the destination mobile unit.

Alternatively to step 506, at step 508, the proxy determines that the message relates to establishing a SIP session over a wireless packet data network. In this case, the proxy compresses all or portions of the SIP INVITE message and the compressed INVITE is sent to the mobile unit over the network. Specifically, the proxy may extract a subset of the header and payload portions of the INVITE message and transmit this subset over the network to the destination.

At step 510, a SIP 200 OK message is received from the mobile unit indicating that the mobile is interested in establishing a connection. It will be understood that additional messages may precede the SIP 200 OK 510 and that other types of messages having a similar purpose can be used if the SIP protocol is not used.

At step 512, a SIP ACK message is sent from the proxy indicating the proxy is giving its final permission to start the session. Again, it will be realized that other types of messages having a similar purpose can be used if the SIP protocol is not used.

At step 514, various messages are exchanged as are known in the art. These may, for instance, include SIP ringing messages, SIP acknowledgment messages, SIP authentication/authorization and data messages. It will be realized that other types of messages may also be included if the SIP protocol is not used. It will be understood that some messages from the mobile unit 102 may contain the mobile's contact address, which may be replaced by the proxy 110 with the associated contact alias, in the way that has been described above.

Thus, through the use of the contact alias, the INVITE message destined for the mobile unit 102 is intercepted by the proxy 110. The INVITE message is compressed by the proxy 110 and forwarded to the mobile unit 102. Advantageously, message size is reduced resulting in less network congestion and greater network efficiency.

The later messages 514 to the mobile unit 102 related to a call started by the INVITE will also be routed to the proxy. These messages will also be compressed by the proxy 110 before they are sent to the mobile unit 102. By using information on the call state stored at the proxy, or by using other information persistently stored at the proxy 110, the proxy may be able to avoid sending some of the messages 514 to the mobile. Instead, the proxy 110 may generate a response message on behalf of the mobile unit 102 and send it to the peer or the server. This can be done, for example with authentication request messages if the proxy persistently stores authentication related information such as a password for the mobile unit 102. In this case, as the result of the compression of the message, no message needs to be routed to the mobile unit. In this case, the interface 310 receives a later SIP message that is sent to the mobile unit 102 from a server or from a peer as the result of an earlier INVITE sent to or from the mobile unit 102. The controller 306 stores the SIP message in the SIP register 304. The controller 306 determines that there is no need to send a message to the mobile unit. Instead, the proxy 110 uses information stored at the proxy and information from the later message to generate a response SIP message in the SIP register 304. The proxy then sends the response SIP message to the interface 310. The interface 310 forwards the modified message via the PDN 118 to the server or the peer.

Figure 6:
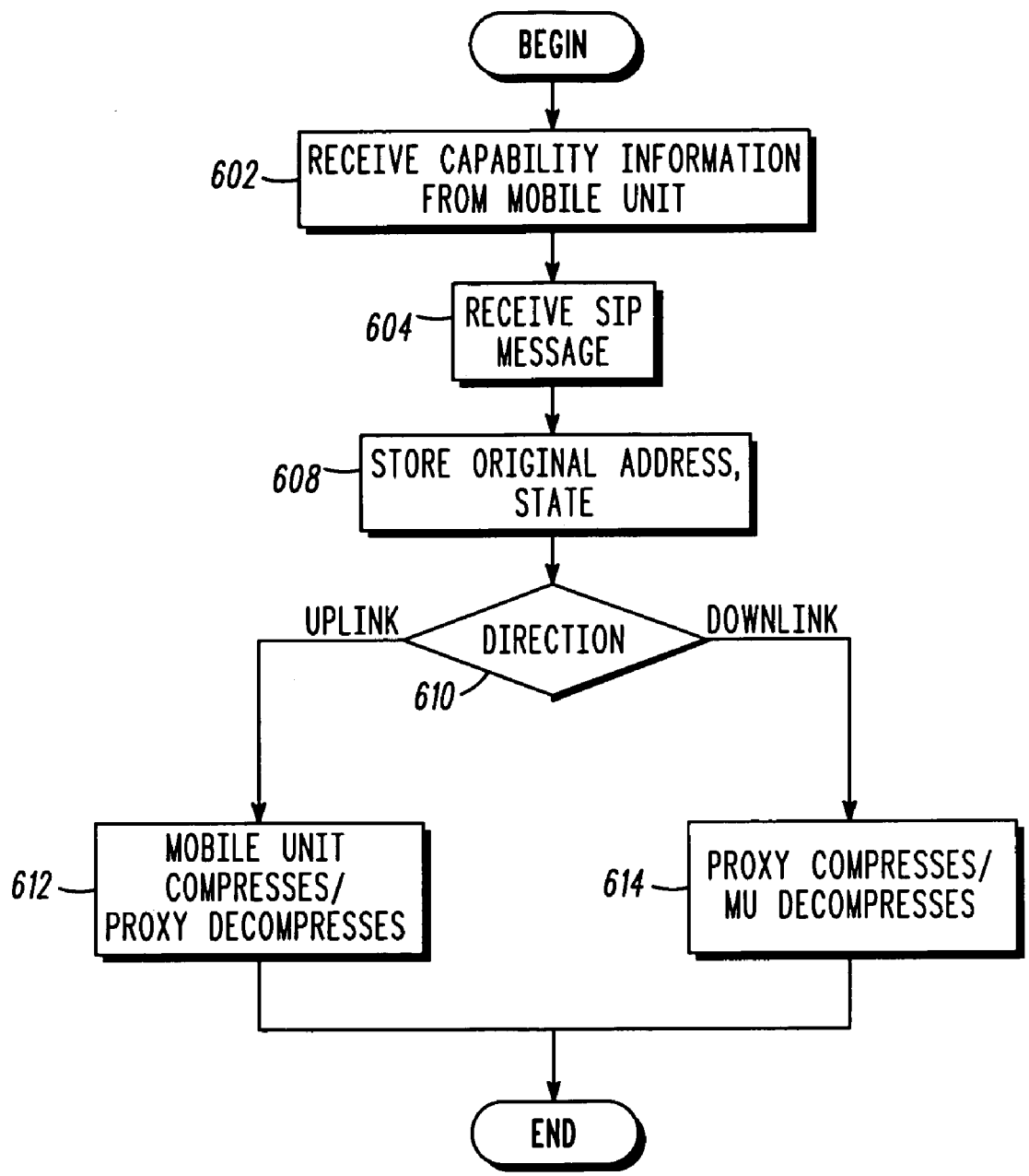
FIG. 6 is a flowchart of a compression process for messages in accordance with one embodiment of the invention.

Referring now to FIG. 6, a method of transmitting compressed information in a network from a source mobile unit to a peer unit is described. In this case, data messages, rather than signaling messages, are compressed and transmitted. In addition, the mobile unit can perform message compression and decompression using algorithms that are known to those skilled in the art.

At step 602, optionally a proxy receives capability information from a mobile unit indicating that the mobile unit processes compressed messages. In one example, the capability information may be in the form of a capability header and indicate that the mobile unit can compress and decompress information. The capability information may also be a Boolean operator indicating whether the mobile unit can compress and/or decompress messages.

At step 604, the proxy receives a SIP message. The SIP message may be a SIP REGISTER message or a SIP INVITE message originated by the mobile unit 102. The SIP message may include a session description protocol (SDP) field. At step 606, the proxy determines the original address in the SIP message and substitutes its address in place of the original address. In particular, the proxy replaces a contact address in the message with a contact alias associated with the contact address.

At step 610, it is determined if a subsequent message is going from the source mobile unit to the peer unit (uplink direction) or from the peer unit to the source mobile unit (downlink direction).

If the direction of the message is in the uplink direction, then at step 612, the mobile unit compresses the message. In case the message were destined for a device that is incapable of decompressing the message, the proxy would decompress the message. However, in the case that the destination has the capability to decompress, the proxy does not need to decompress the message, obviating the need for the proxy to recompress before forwarding the message on to the destination mobile. The proxy also determines whether the message contains a contact address and replaces it with the contact alias associated with the contact address. The proxy 110 forwards the modified message via the PDN 118 to a server. The server can be a SIP server 116 or a SIP registrar 122.

If the message transmission is occurring in the downlink direction, then, at step 614, the proxy compresses the message and the mobile unit decompresses the message. In this case, the message is routed first to the proxy before it is transmitted to the mobile unit. Thus, all SIP messages are compressed before being transmitted. Wireless network congestion is reduced and the speed of information transmission is increased.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of facilitating communications at a proxy in a network comprising:
   receiving a message from a mobile unit having a contact address;
   establishing a contact alias associated with the mobile unit and the contact address, the contact alias substantially containing the contact address;
   intercepting and identifying at the proxy at least one signaling message from a server directed to the mobile unit that includes the contact address for a session directed to the mobile unit;
   compressing the at least one signaling message that includes the contact address;
   routing the compressed at least one signaling message to the mobile unit with the contact address;
   intercepting and identifying at the proxy at least one later signaling message from the server directed to the mobile unit, wherein the intercepting and identifying at the proxy the at least one later signaling message further comprises identifying the at least one later signaling message for the session directed to the mobile unit using the contact alias;
   determining whether there is a need to route a message corresponding to the at least one later signaling message to the mobile unit;
   when it is determined that there is the need to route the message corresponding to the at least one later signaling message to the mobile unit:
      compressing the at least one later signaling message, and
      routing the compressed at least one later signaling message to the mobile unit; and
   when it is determined that there is not the need to route the message corresponding to the at least one later signaling message to the mobile unit:
      not routing the message corresponding to the at least one later signaling message to the mobile unit, and
      responding to the at least one later signaling message.

2. The method of claim 1 wherein the message from the mobile unit is one of a SIP REGISTER message, a SIP INVITE message; a SIP OK message; a SIP OPTIONS message; and a SIP BYE message.

3. The method of claim 1 further comprising decompressing a signaling message received from the mobile unit and forwarding the decompressed signaling message to the server.

4. The method of claim 1 wherein receiving the message from the mobile unit having a contact address, comprises receiving a registration message that includes an indication that the mobile unit processes compressed messages.

5. The method of claim 1 wherein receiving the message from the mobile unit having a contact address, includes receiving a capabilities header indicating an ability to process compressed messages.

6. The method of claim 1 further comprising advertising the presence of the proxy for signaling message compression to the mobile unit.

7. The method of claim 1 wherein the step of intercepting and identifying at the proxy at least one signaling message that includes the contact address for a session for the mobile unit includes intercepting and identifying a SIP message.

8. A method for compressing communications at a proxy for SIP message compression, the method comprising:
   receiving a message with a contact address from a mobile unit having the contact address;
   establishing a contact alias associated with the mobile unit and the contact address, the contact alias substantially containing the contact address;
   intercepting and identifying at the proxy at least one SIP message from a server that includes the contact address, the at least one SIP message directed to the mobile unit, wherein the intercepting and identifying the at least one SIP message from the server that includes the contact address comprises intercepting the at least one SIP message using the contact alias;
   compressing the at least one SIP message that includes the contact address at the proxy to obtain at least one corresponding compressed message;
   routing the at least one corresponding compressed message to the mobile unit;
   intercepting and identifying at the proxy at least one later SIP message from the server, the at least one later SIP message directed to the mobile unit;
   determining that there is a need to route a message corresponding to the at least one later SIP message to the mobile unit;
   when determining that there is not the need to route the message corresponding to the at least one later SIP message to the mobile unit:
      generating a SIP response message for the at least one later SIP message, and
      sending the SIP response message to the server; and
   when determining that there is the need to route the message corresponding to the at least one later SIP message to the mobile unit:
      compressing the at least one later SIP message to obtain at least one later corresponding compressed message, and
      routing the at least one later corresponding compressed message to the mobile unit.

9. The method of claim 8 wherein the message with the contact address from the mobile unit is one of a SIP REGISTER message; a SIP INVITE message; a SIP OK message; a SIP BYE message; and a SIP OPTIONS message.

10. The method of claim 8 further comprising decompressing a SIP message received from the mobile unit and forwarding the decompressed SIP message to the server.

11. The method of claim 8 wherein the message with the contact address from the mobile unit includes an indication that the mobile unit processes compressed messages.

12. The method of claim 8 further comprising advertising the presence of the proxy for SIP message compression to the mobile unit.

13. The method of claim 8 further comprising receiving authentication information from the mobile unit to facilitate authentication of the mobile unit.

14. The method of claim 8 wherein the at least one compressed message is a legacy cellular call setup message.

15. A device for facilitating communications in a network with a mobile unit having a contact address comprising:
   a SIP register storing a first SIP message, the first SIP message identifiable as being destined for the contact address of the mobile unit; and
   a controller coupled to the SIP register and having an output, the controller compressing the first SIP message in the SIP register and placing the compressed first SIP message on the output for transmitting the compressed first SIP message to the mobile unit wherein the controller being programmed for:

receiving a second SIP message in the SIP register, determining whether there is a need to send a message to the mobile unit corresponding to the second SIP message, for when there is not the need to send the message to the mobile unit corresponding to the second SIP message, generating a SIP response message to the second SIP message on behalf of the mobile unit and placing the SIP response message on the output for transmitting the SIP response message to the server, and for when there is the need to send the message to the mobile unit corresponding to the second SIP message, compressing the second SIP message in the SIP register and placing the compressed second SIP message on the output for transmitting the compressed second SIP message to the mobile unit.

16. The apparatus of claim 15 wherein the compressed first SIP message is a legacy cellular call setup message.

17. The apparatus of claim 15 wherein the second SIP message is an authentication request.

18. The apparatus of claim 15 further comprising an alias register storing a contact alias associated with the contact address of the mobile unit and wherein the controller comprises means for determining and forming the contact alias in the alias register.

19. The apparatus of claim 18 wherein the controller forms the contact alias such that it contains the contact address information.

20. The apparatus of claim 16 wherein the controller comprises means for compressing and routing the second SIP message to the mobile unit upon a determination that the second SIP message is directed to a contact alias.

* * * * *